L. CARTER.
Bale-Ties.

No. 145,091.

Patented Dec. 2, 1873.

Witnesses.
A. W. Almqvist
Alex F. Roberts.

Inventor,
L. Carter
Per
Attorneys.

UNITED STATES PATENT OFFICE.

LANDON CARTER, OF HUNTSVILLE, ALABAMA.

IMPROVEMENT IN BALE-TIES.

Specification forming part of Letters Patent No. 145,091, dated December 2, 1873; application filed October 4, 1873.

*To all whom it may concern:*

Be it known that I, LANDON CARTER, of Huntsville, in the county of Madison and State of Alabama, have invented a new and Improved Cotton-Bale Tie, of which the following is a specification:

In connection with a block and a clip or socket piece, both attached to one end of the band, and having flanges bent inward over the latter, I employ a wedge, which is cut away or shouldered on its under side to adapt it to be inserted in the clip or socket piece, so as to bend and clamp the free end of the band, as hereinafter set forth.

Figure 1:
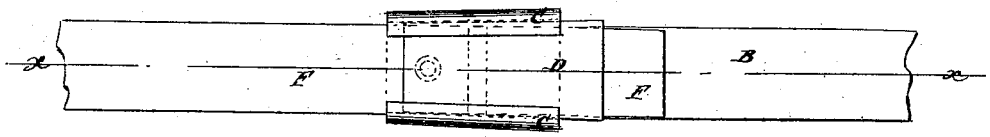
Figure 2:
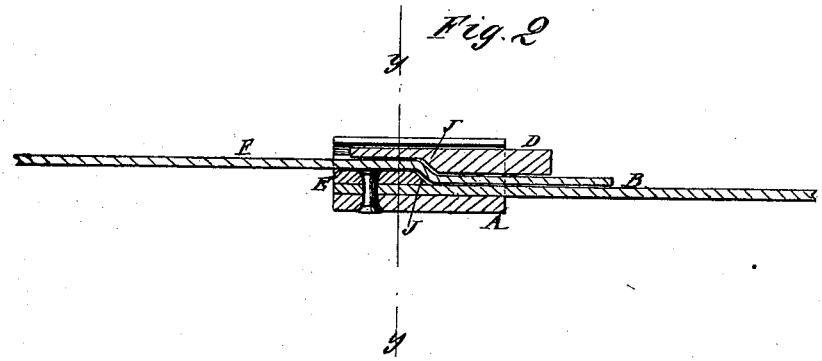
Figure 3:
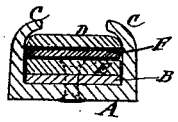

Figure 1 is a plan view of my improved cotton-bale tie, together with portions of the hoop or band. Fig. 2 is a longitudinal sectional elevation taken on the line $x$ $x$ of Fig. 1; and Fig. 3 is a cross-section taken on the line $y$ $y$ of Fig. 2.

A represents the clip, which is slightly tapered, and riveted or otherwise fastened to the end B of the band. C represents the flanges of the clip, which are bent or curved inward, as shown. E is a block fastened to the bottom or base of the clip over the end of the band. D is a wedge, which is cut away on the under side at its narrower end, forming a shoulder, J, and adapting it to fit over the block E, as shown.

In fastening the band, the end F thereof is drawn through the clip as tightly as it can be, and the wedge D is driven in between it and the flanges C of the clip, so as to wedge it tightly on the block E, and at the same time to bend the band at J so that it cannot slip back, as it would if the friction of the wedge alone were depended on to hold it.

I thus make an effectual lock which cannot unfasten while the key remains, and that is insured by the tapered form of the clip.

Having thus described my invention, what I claim as new, and desire to secure by Letters Patent, is—

The combination of the halved or shouldered wedge J with the clip A C and block E, secured to the end B of the band, as shown and described, whereby the end F is bent and secured, as specified.

LANDON CARTER.

Witnesses:
J. R. JONES,
W. R. RISON.